US006957840B1

(12) United States Patent
Endres

(10) Patent No.: US 6,957,840 B1
(45) Date of Patent: Oct. 25, 2005

(54) TAILGATE EXTENSION SYSTEM

(76) Inventor: James L. Endres, 1855 Stratford, Sylvan Lake, MI (US) 48320

(*) Notice: Subject to any disclaimer, the term of this patent is extended or adjusted under 35 U.S.C. 154(b) by 0 days.

(21) Appl. No.: 10/982,984

(22) Filed: Nov. 8, 2004

(51) Int. Cl.[7] .............................................. B62D 25/00
(52) U.S. Cl. .................... 296/57.1; 296/26.08; 296/50; 296/51
(58) Field of Search ............................ 296/26.08, 37.6, 296/50, 51, 57.1

(56) References Cited

U.S. PATENT DOCUMENTS

| | | | |
|---|---|---|---|
| 4,023,850 A | 5/1977 | Tillery | |
| 4,114,944 A | 9/1978 | Joynt et al. | |
| D352,262 S | 11/1994 | Hawkes et al. | |
| 5,468,038 A | 11/1995 | Sauri | |
| 5,924,753 A | 7/1999 | DiBassie | |
| 6,454,338 B1 | 9/2002 | Glickman et al. | |
| 6,698,810 B1 * | 3/2004 | Lane | 296/57.1 |
| 2004/0227368 A1 * | 11/2004 | Seksaria et al. | 296/57.1 |

* cited by examiner

*Primary Examiner*—Lori L. Coletta

(57) ABSTRACT

A tailgate extension system includes a pickup bed having an outer edge. A pair of side walls is attached to the pickup bed. A tailgate housing has a front wall, a back wall, a top wall, a bottom wall, a first lateral wall and a second lateral wall. The back wall has an elongated opening therein generally extending from the first lateral wall to the second lateral wall. Each of the first and second lateral walls is hingedly coupled to one of the side walls. The housing is selectively positionable in a horizontal position extending away from the pickup bed or in a vertical position extending upwardly from the pickup bed. A panel is positioned within the housing and is selectively positioned in an extended orientation extending outwardly of the opening or in a stored orientation positioned substantially within the housing.

4 Claims, 3 Drawing Sheets

TAILGATE EXTENSION SYSTEM

BACKGROUND OF THE INVENTION

1. Field of the Invention

The present invention relates to tailgate extending devices and more particularly pertains to a new tailgate extending device for increasing the work surface of a pick-up tailgate.

2. Description of the Prior Art

The use of tailgate extending devices is known in the prior art. U.S. Pat. No. 4,114,944 describes a telescopic tailgate extension adapted for increasing the load capacity of a pick up bed. Another type of tailgate extending device is U.S. Pat. No. 5,924,753 having a pair of extendable side walls that are attached to a pick up bed and which may be used for extending a tailgate outwardly away from a pickup bed. Yet another such device is found U.S. Pat. No. 6,454,338 which includes a panel that is hingedly coupled to an upper edge of a tailgate to increase an effective length of the tailgate.

While these devices fulfill their respective, particular objectives and requirements, the need remains for a device that is readily adaptable to existing pick-up beds to be used generally as a conventional tailgate but which may be selectively extended to provide additional space for a work surface.

SUMMARY OF THE INVENTION

The present invention meets the needs presented above by generally comprising a pickup bed having an outer edge. A pair of side walls is attached to the pickup bed. A tailgate housing has a front wall, a back wall, a top wall, a bottom wall, a first lateral wall and a second lateral wall. The front and back walls each have a length generally equal to a length of the outer edge. The back wall has an elongated opening therein generally extending from the first lateral wall to the second lateral wall. Each of the first and second lateral walls is hingedly coupled to one of the side walls so that the front wall is positioned adjacent to the bed and extends along the outer edge. The housing is selectively positionable in a horizontal position extending away from the pickup bed or in a vertical position extending upwardly from the pickup bed. A panel is positioned within the housing and is selectively positioned in an extended orientation extending outwardly of the opening or in a stored orientation positioned substantially within the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
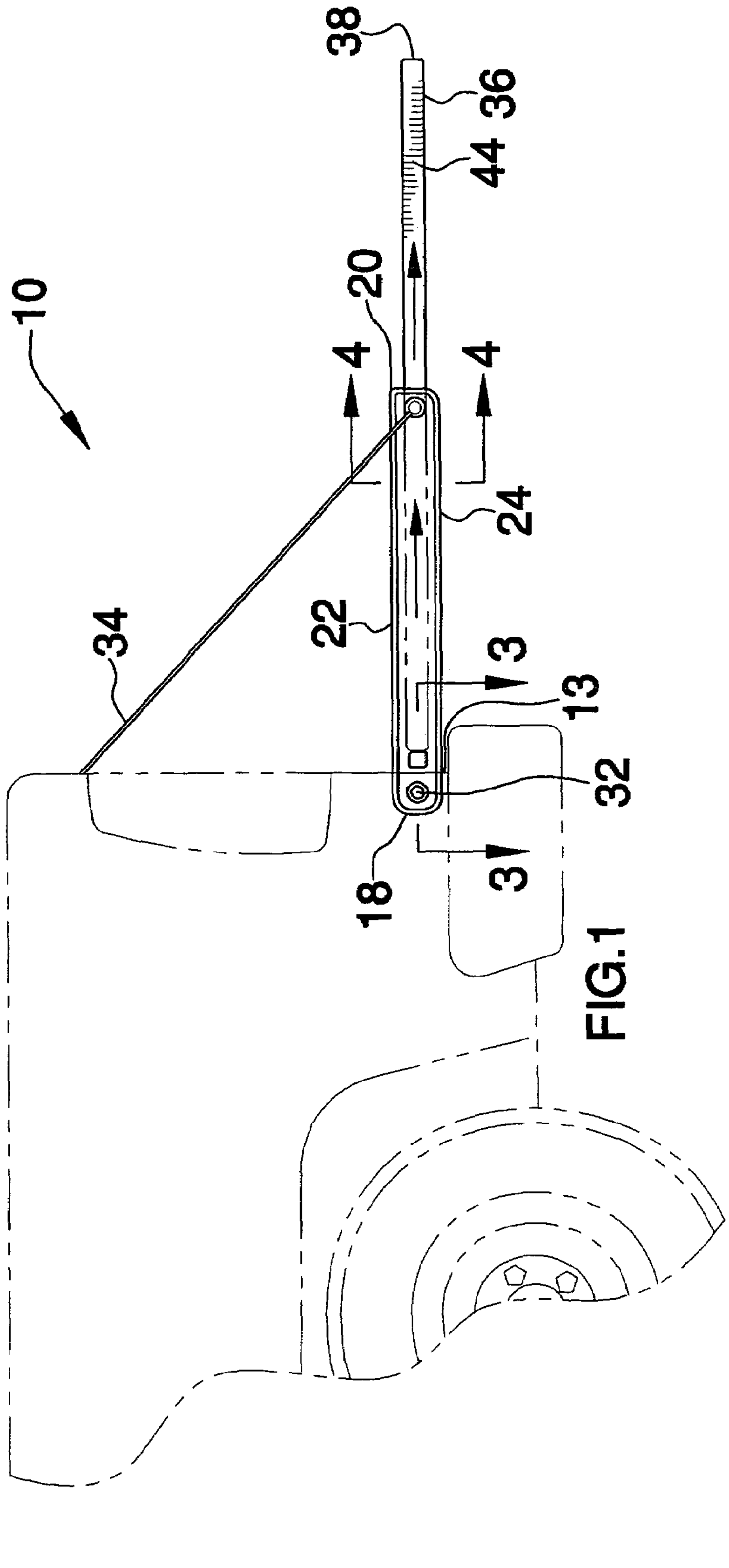
FIG. 1 is a side view of a tailgate extension system according to the present invention.
Figure 2:
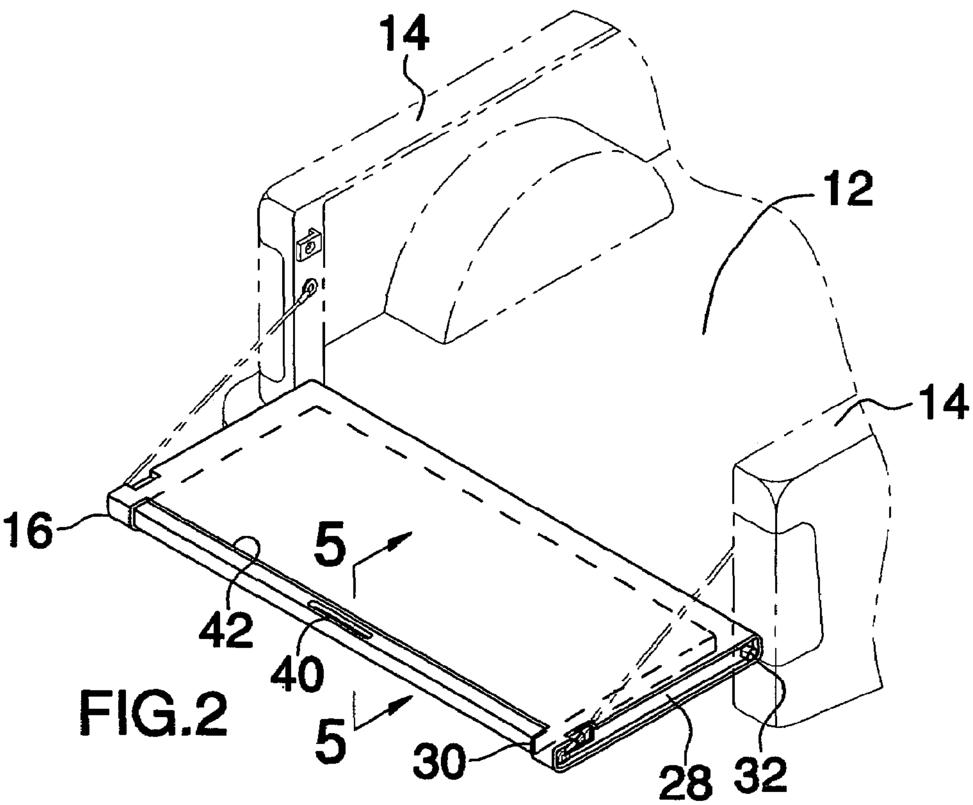
FIG. 2 is a perspective view of the present invention.
Figure 3:
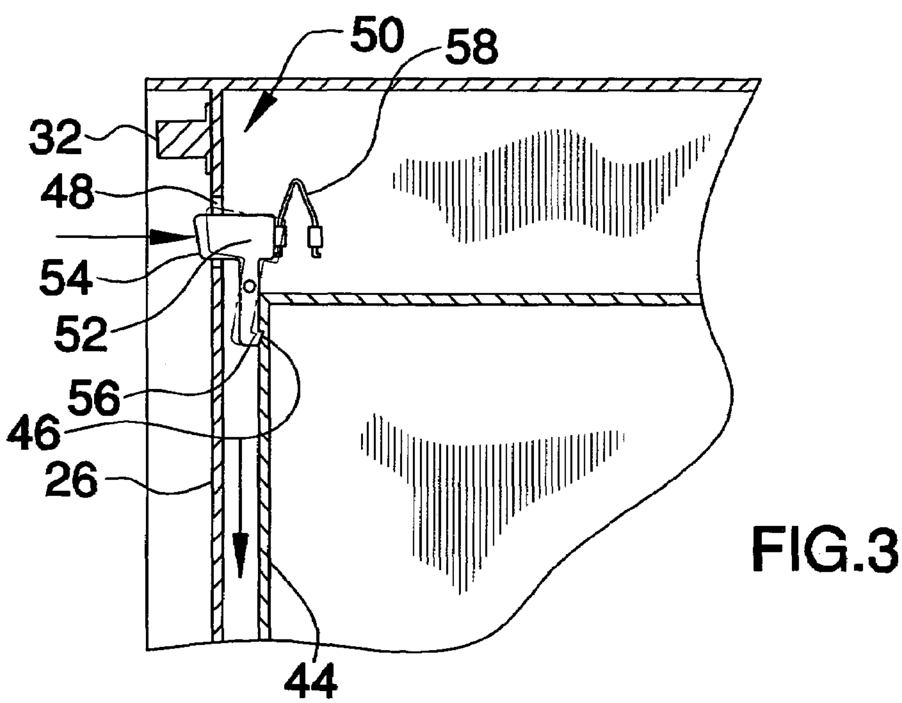
FIG. 3 is a cross-sectional view taken along line 3—3 of FIG. 1 of the present invention.
Figure 4:
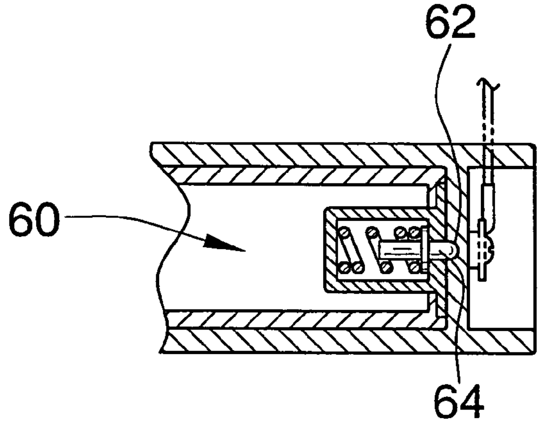
FIG. 4 is a cross-sectional view taken along line 4—4 of FIG. 1 of the present invention.
Figure 5:
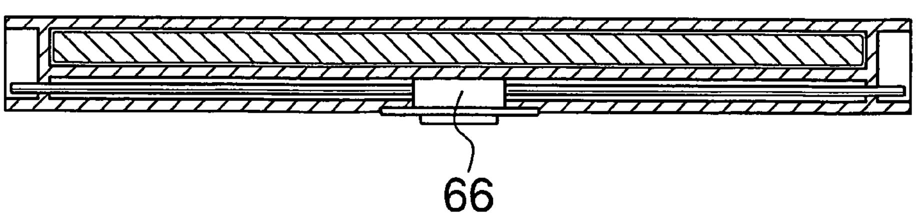
FIG. 5 is a cross-sectional view taken along line 5—5 of FIG. 2 of the present invention.

With reference now to the drawings, and in particular to FIGS. 1 through 5 thereof, a new tailgate extending device embodying the principles and concepts of the present invention and generally designated by the reference numeral 10 will be described.

As best illustrated in FIGS. 1 through 5, the tailgate extension system 10 generally comprises a device for use on a conventional pickup bed 12 has an outer edge 13 and includes a pair of side walls 14 framing the bed. A tailgate housing 16 is included which has a front wall 18, a back wall 20, a top wall 22, a bottom wall 24, a first lateral wall 26 and a second lateral wall 28. The front 18 and back 20 walls each have a length generally equal to a length of the outer edge 13. A distance between the top 22 and bottom 24 walls is generally between one inch and four inches. The back wall 20 has an elongated opening 30 therein that generally extends from the first lateral wall 26 to the second lateral wall 28. Each of the first 26 and second 28 lateral walls is hingedly coupled to one of the side walls 14 so that the front wall 18 is positioned adjacent to the bed 12 and extends along the outer edge 13. Rods 32 attached to each of the first 26 and second 28 lateral walls, and positioned adjacent to the front wall 18, may be extended into the side walls 14 for hingedly coupling the housing 16 to the side walls 14. The housing 12 is selectively positionable in a horizontal position extending away from the pickup bed 12 or in a vertical position extending upwardly from the pickup bed 12. Tethers 34 may be attached to and extended between ends of the side walls 14 and an adjacent one of the first 26 and second 28 lateral walls to aid in preventing the housing 16 from extending below a plane orientated parallel with the bed 12.

A rigid panel 36 is positioned within the housing. The panel 36 is selectively positioned in an extended orientation extending outwardly of the opening 30 or in a stored orientation positioned substantially within the housing 16. The panel 36 has a proximal end 38 with respect to the opening 30. The panel 36 has a gripping depression 40 therein positioned adjacent to the proximal end 38. Elongated notches 42 may be positioned in the top 22 and bottom 24 walls for allowing easy gripping of the depression 40 and the proximal end 38 of the panel 36.

A locking assembly 50 is adapted for releasably securing the panel 36 in the stored orientation. The locking assembly includes 50 a detent 52 pivotally mounted within in the housing 16 and includes a first catch 54 and a second catch 56. A first lateral edge 44 of the panel 36 has an indentation 46 therein. The first lateral wall 26 has an aperture 48 extending therethrough. The first catch 54 extends outwardly through the aperture 48 and the second catch 56 extends into the indentation 46 when the panel 36 is in the stored orientation. A biasing member 58 biases the first catch 54 outwardly of the aperture 48. A securing member 60 may be mounted within the first lateral edge 44 to engage an indent 62 in an inner surface of one of the first 26 and second 28 lateral walls. The securing member 60 prevents the accidental movement of the panel 36 out of the housing 16 and includes a pin 64 biased into the indent 62. The pin 64 has a rounded end so that it may slide out of the indent 62 when the sufficient force is applied on the panel 36.

In use, the housing 16 performs as a conventional tailgate and preferably includes a conventional latching assembly 66 for securing the housing 16 in the vertical position. When extra workspace is needed, the panel 36 is removed from the housing 16 and it serves as increased workspace. When not in use, the panel 36 is stored within the housing 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An extendable tailgate system comprising:

a pickup bed having an outer edge, a pair of side walls being attached to said pickup bed;

a tailgate housing having a front wall, a back wall, a top wall, a bottom wall, a first lateral wall and a second lateral wall, said front and back walls having a length generally equal to a length of said outer edge, said back wall having an elongated opening therein generally extending from said first lateral wall to said second lateral wall, each of said first and second lateral walls being hingedly coupled to one of said side walls such that said front wall is positioned adjacent to said bed and extends along said outer edge, said housing being selectively positionable in a horizontal position extending away from said pickup bed or in a vertical position extending upwardly from said pickup bed;

a panel being positioned within said housing, said panel being selectively positioned in an extended orientation extending outwardly of said opening or in a stored orientation positioned substantially within said housing; and a locking assembly adapted for releasably securing said panel in said stored orientation.

2. The system according to claim 1, wherein said panel has a proximal end with respect to said opening, said panel having a gripping depression therein positioned adjacent to said proximal end.

3. The system according to claim 1, wherein said locking assembly includes a detent being pivotally mounted within in said housing and including a first catch and a second catch, a first lateral edge of said panel having an indentation therein, said first lateral wall having an aperture extending therethrough, said first catch extending outwardly through said aperture and said second catch extending into said indentation when said panel is in said stored orientation, said first catch being biased outwardly of said aperture.

4. An extendable tailgate system comprising:

a pickup bed having an outer edge, said bed including a pair of side walls;

a tailgate housing having a front wall, a back wall, a top wall, a bottom wall, a first lateral wall and a second lateral wall, said front and back walls having a length generally equal to a length of said outer edge, said back wall having an elongated opening therein generally extending from said first lateral wall to said second lateral wall, each of said first and second lateral walls being hingedly coupled to one of said side walls such that said front wall is positioned adjacent to said bed and extends along said outer edge, said housing being selectively positionable in a horizontal position extending away from said pickup bed or in a vertical position extending upwardly from said pickup bed;

a panel being positioned within said housing, said panel being selectively positioned in an extended orientation extending outwardly of said opening or in a stored orientation positioned substantially within said housing, said panel having a proximal end with respect to said opening, said panel having a gripping depression therein positioned adjacent to said proximal end; and a locking assembly being adapted for releasably securing said panel in said stored orientation, said locking assembly including a detent being pivotally mounted within in said housing and including a first catch and a second catch, a first lateral edge of said panel having an indentation therein, said first lateral wall having an aperture extending therethrough, said first catch extending outwardly through said aperture and said second catch extending into said indentation when said panel is in said stored orientation, said first catch being biased outwardly of said aperture.

* * * * *